US 6,600,476 B2

(12) United States Patent
Mathis et al.

(10) Patent No.: US 6,600,476 B2
(45) Date of Patent: Jul. 29, 2003

(54) VIDEO AID SYSTEM FOR AUTOMATIC DISPLAY OF ELECTRONIC MANUFACTURING DRAWINGS

(75) Inventors: Dennis R. Mathis, Tulsa, OK (US); Dana B. Jackson, Broken Arrow, OK (US)

(73) Assignee: The Boeing Company, Seattle, WA (US)

( * ) Notice: Subject to any disclaimer, the term of this patent is extended or adjusted under 35 U.S.C. 154(b) by 190 days.

(21) Appl. No.: 09/938,054

(22) Filed: Aug. 23, 2001

(65) Prior Publication Data

US 2002/0051008 A1 May 2, 2002

Related U.S. Application Data

(60) Provisional application No. 60/227,702, filed on Aug. 24, 2000.

(51) Int. Cl.$^7$ ................................................. G06F 19/00
(52) U.S. Cl. ........................ 345/156; 700/95; 700/115
(58) Field of Search .......................... 345/121, 123, 345/145, 156, 2; 700/95, 108, 111, 96, 115; 434/118

(56) References Cited

U.S. PATENT DOCUMENTS

| | | | | |
|---|---|---|---|---|
| 4,395,236 A | * | 7/1983 | Gotthold | 434/219 |
| 5,121,319 A | * | 6/1992 | Fath et al. | 700/83 |
| 5,274,363 A | * | 12/1993 | Koved et al. | 345/2.1 |
| 5,289,168 A | | 2/1994 | Freeman | |
| 5,315,522 A | * | 5/1994 | Kauffman et al. | 700/165 |
| 5,717,595 A | * | 2/1998 | Cherrington et al. | 705/400 |
| 5,757,647 A | * | 5/1998 | DeMichele | 700/95 |
| 5,825,349 A | | 10/1998 | Meier et al. | |
| 5,949,442 A | | 9/1999 | Nishiyama | |
| 6,016,110 A | | 1/2000 | Takinami | |
| 6,067,068 A | | 5/2000 | Hussain | |
| 6,477,437 B1 | * | 11/2002 | Hirota | 700/95 |

* cited by examiner

Primary Examiner—Vijay Shankar
Assistant Examiner—Nitin Patel
(74) Attorney, Agent, or Firm—Alston & Bird LLP (57) ABSTRACT

The present invention is a video aid to assembly system and methods of using the system for providing production personnel access to manufacturing drawing information with minimum user intervention. The system scrolls manufacturing drawings automatically as a monitor is moved relative to a workpiece so that the manufacturing drawing corresponds with the identical location on the workpiece. The system also eliminates the need to store, retrieve, and maintain individual hardcopy drawings. In addition, the color capabilities of the system improve detailed part recognition and provide the ability to highlight items that require special attention. Moreover, mark-ups, such as build instructions or modifications, can be electronically overlaid on the drawing without modifying the original assembly drawing.

28 Claims, 4 Drawing Sheets

VIDEO AID SYSTEM FOR AUTOMATIC DISPLAY OF ELECTRONIC MANUFACTURING DRAWINGS

CROSS-REFERENCE TO RELATED APPLICATION

The present application claims priority from U.S. Provisional Patent Application Ser. No. 60/227,702 entitled "Video Aid System for Automatic Display of Electronic Manufacturing Devices", filed on Aug. 24, 2000, the contents of which are incorporated by reference.

FIELD OF THE INVENTION

The present invention relates to video display systems, and more particularly to video display systems and methods for providing automatic display of electronic manufacturing drawings during assembly of elongated workpieces.

BACKGROUND OF THE INVENTION

The manufacture and assembly of elongated workpieces, such as floorbeam assemblies for a commercial aircraft, is a labor-intensive and tedious operation. For example, commercial aircraft floorbeam assemblies typically vary in length from 14 to 23 feet long, and can have over 150 assembly configurations for a single aircraft. Oftentimes a single mechanic is required to install various subassemblies or attachments to the floorbeam.

Figure 1:
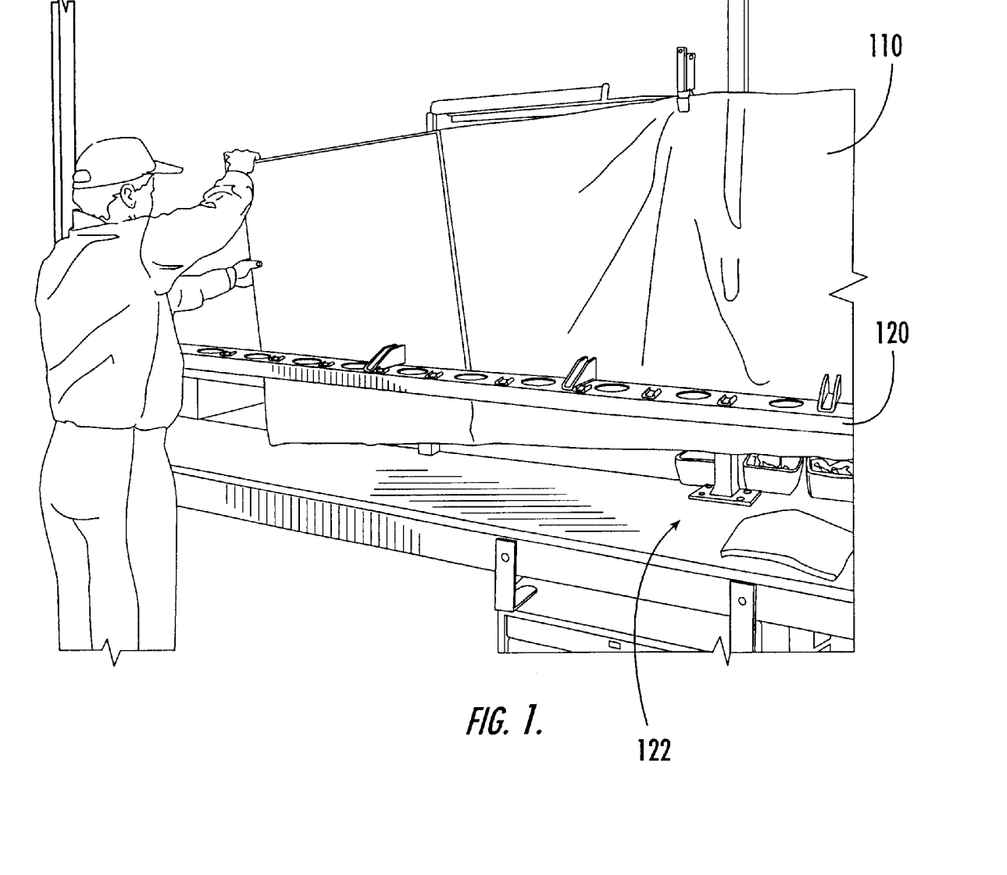
FIG. 1 is a perspective view of a conventional assembly workstation employing hard copy assembly drawings.

To assist the mechanic in assembling the floorbeam, visual aids and instructions are provided in the form of assembly maps or drawings. Typically, the floorbeam is set up at the mechanic's workstation or bench, and the assembly drawings are spread out behind the bench so that the mechanic can refer to the drawings during assembly. In particular, due to the array of different floorbeam assemblies for the mechanic (and subsequent inspection teams) and the complexity of each floorbeam, full-scale drawings are used so that the mechanic can constantly refer to the drawings while working at any point along the floorbeam. As shown in FIG. 1, a floorbeam drawing typically consists of three or more large Mylar sheets 110 that are taped together and marked up with comments and warnings. Therefore, the full-scale assembly drawings for each floorbeam 120 must be rolled up, stored, and a new full-scale assembly drawing must be retrieved and spread out across the back of the workstation 122 before assembling the next floorbeam or other workpiece. To make matters worse, working inventory is usually minimized so that identical floorbeams are not built consecutively. Thus, the mechanic wastes valuable time retrieving and storing assembly drawings for each floorbeam assembly.

Moreover, conventional Mylar assembly drawings can cause compliance issues with governing bodies. In particular, conventional drawings are often considered "uncontrolled" documents, since changes can be made to the drawings without proper verification. Such changes can lead to audit failures performed by governing bodies, such as the Federal Aviation Administration (FAA) or the International Organization for Standardization (ISO). In addition, conventional drawings must be kept current, replaced when worn or damaged, and the notes and mark-ups must be transferred to any replacement drawings.

Another assembly method that also suffers from the use of conventional assembly drawings is the moving assembly line. Previously, assembly methods using moving lines to assemble long, complex assemblies were hampered by the inability to display the assembly or manufacturing drawing of the part as it moved past the assembly mechanic. The handling drawbacks of repositioning the drawing as the workpiece moved past the mechanic are obvious. Moreover, it would be highly impractical, if not impossible, to assemble more than one assembly configuration on a moving assembly line where the mechanic would be required to retrieve a new drawing for each assembly configuration.

To aid in workpiece assembly, systems have been developed that project assembly drawings of the workpiece onto the actual surface of the workpiece via one or more fixed laser projectors. The laser projectors are typically set about ten feet above the workpiece in order to maximize the coverage of laser projections over the workpiece. However, as the distance between the workpiece and the laser projectors increases, the projected drawings can become distorted as the lasers intersect the workpiece at oblique angles at areas not directly under the lasers. Further distortions can be caused if the lasers encounter surface irregularities on the workpiece, which increase the level of distortion as the distance between the workpiece and projectors increases. Optic devices and software can be used to correct the distortions, but at a significant cost.

Another conventional system employs a virtual reality system that includes a device for sensing the position of a wearer's head (i.e., the direction of view) and a head-mounted, transparent viewing screen for displaying a corresponding view. In the virtual reality or head-mounted display systems, however, the image is determined by the wearer's head angular orientation in relation to the workpiece, which can disorient the wearer. In addition, these systems do not provide any view other than true scale, as magnifying the scale (zooming in) would also disorient the wearer.

SUMMARY OF THE INVENTION

The present invention is directed to a visual aid apparatus for providing assembly instructions of a workpiece. Advantageously, the apparatus of the present invention eliminates the hardcopy drawings and associated problems of conventional assembly systems by employing a computer, monitor, and a position-sensing device that determine the position of the monitor relative to the workpiece and determine assembly instructions corresponding to the workpiece at the location of the monitor. The assembly instructions are then displayed on the monitor, which can be moved along the workpiece displaying corresponding assembly instructions as the monitor moves. Thus, the assembly instructions are maintained by the computer of the present invention and displayed by the monitor, which thereby greatly simplifies the workpiece assembly process.

In particular, a visual aid apparatus for providing assembly instructions of a workpiece according to one embodiment of the present invention comprises a computer having a memory device and an elongated rail extending lengthwise proximate the workpiece. A monitor is movably mounted to the rail and operatively connected to the computer, such as wirelessly connected or hardwired thereto. The monitor is preferably a color monitor. In addition, storage bins for fasteners and the like may also be operatively attached to the monitor so that the monitor and bins can move along the rail. Preferably, the monitor and bins move together, although the bins could move separately from the monitor.

The visual aid apparatus of the present invention also includes a position-sensing device that is attached to the monitor. The position-sensing device is capable of determining the position of the monitor relative to the workpiece and sending the relative position to the computer. In one embodiment, the position-sensing device includes a timing belt and a timing belt pulley that move relative to the monitor such that the position of the monitor can be determined by a corresponding rotational position of the timing belt pulley. The position-sensing device may include alternatively a laser range finder, linear transducer, or cable encoder in order to determine the position of the monitor relative to the workpiece. The monitor is also movable along the rail, and the computer is capable of refreshing the monitor to display the corresponding assembly instructions for the workpiece while the monitor is moving.

The computer is capable of determining assembly instructions corresponding to the relative position of the monitor and providing the assembly instructions for display on the monitor. In one embodiment, the assembly instructions are in color, wherein similar components of the workpiece are depicted in a similar color. In addition, warnings or alerts can be depicted in another color to alert the operator to ambiguous or important information in the assembly instructions. In one embodiment, the assembly instructions include an original assembly drawing and at least one mark-up instruction that provides at least one revision to the original assembly drawing.

Thus, the visual aid apparatus of the present invention eliminates the cumbersome hardcopy drawings used in conventional assemblies. Advantageously, the apparatus and methods of the present invention improve the safety, document control, and efficiency of the assembly process. No longer are mechanics and operators required to roll up cumbersome drawing sheets for storage, only to unroll the drawings again for subsequent use. By contrast, the assembly instructions of the present invention are maintained in the computer such that they can be quickly and easily recalled and updated.

BRIEF DESCRIPTION OF THE DRAWINGS

Reference will now be made to the accompanying drawings, which are not necessarily drawn to scale, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
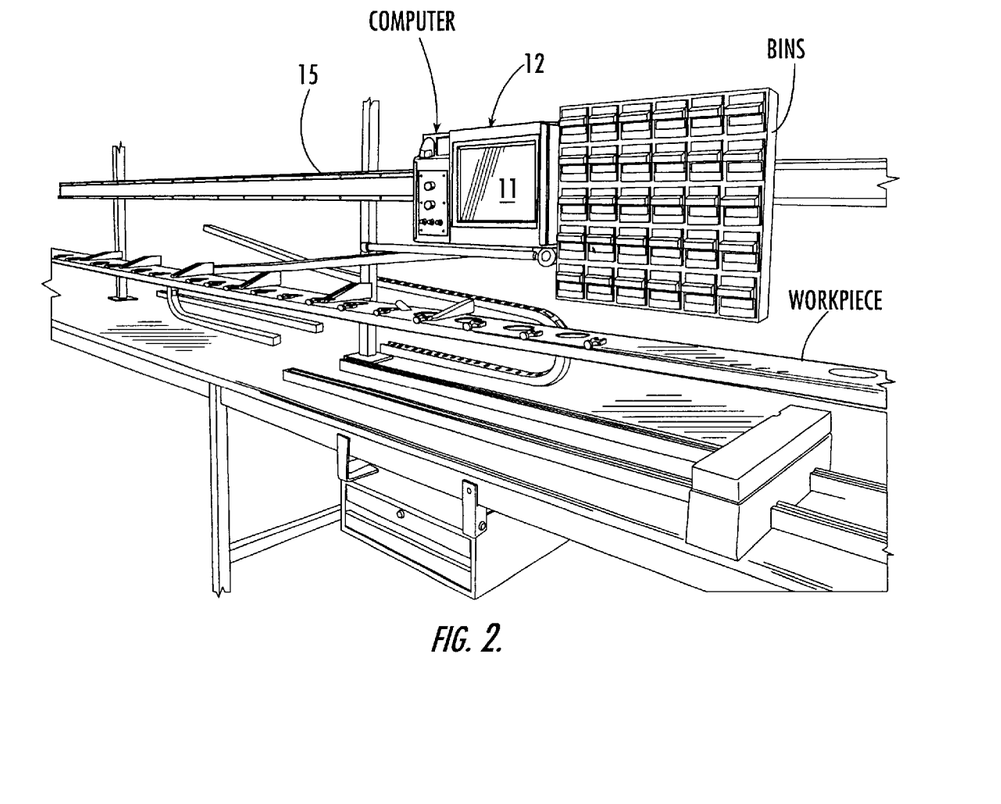
FIG. 2 is a perspective view of an assembly workstation employing a video aid to assembly system according to one embodiment of the present invention.

The present invention is directed to a video aid and methods for using a video aid in the assembly of elongated workpieces, such as commercial aircraft floorbeams. FIG. 2 shows a perspective view of the video aid system according to one embodiment of the present invention. In general, the system comprises a computer having a processor and/or a memory device; a computer video monitor or video projector; user controls for adjusting the viewing preferences in selected drawing views; an elongated rail or similar conveyor for moving the video monitor and/or moving the workpiece; position sensing devices, such as encoders, range finders, or other devices, for determining the relative position between the video monitor and the workpiece; and software that collects information from the position sensing devices and user controls and then displays assembly instructions, such as appropriate sections of a manufacturing drawing, on the video monitor. Thus, the video aid to assembly (VAA) system and methods of the present invention are designed to automatically display the relevant section of a manufacturing drawing corresponding to the area of a workpiece, such as an elongated floorbeam assembly for a commercial aircraft, on which a mechanic is currently working. Further details of the VAA system are discussed more fully below.

The VAA system includes a computer or other computing device, wherein the computer or computing device can be a part of a larger computer network, such as, for example, the Internet, a local area network (LAN), a wide area network (WAN), an Intranet, or an Extranet. Such a computer may comprise, for example, a desktop personal computer, a laptop personal computer, a server, a router, a mainframe computer, or like devices or combinations thereof capable of implementing the functions and methods as described herein as known to one skilled in the art. The computer may stand alone or may be mounted to other components of the system as described herein. In one embodiment, the computer uses a 400 MHz Pentium II processor and an ATI Rage Pro graphics card. These components allow the display of the assembly drawing to be refreshed or updated around 10 times per second, which gives a relatively smooth scrolling of the drawing. Faster and more sophisticated computer components can also be used for even faster refreshing rates.

Figure 3:
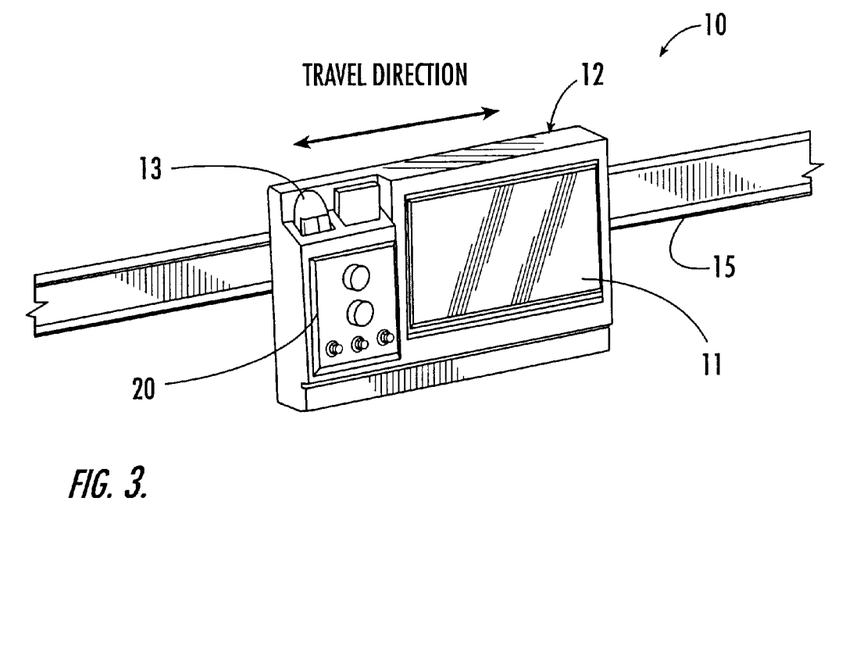
FIG. 3 is a front perspective view of a display assembly and a rail according to one embodiment of the present invention.
Figure 4:
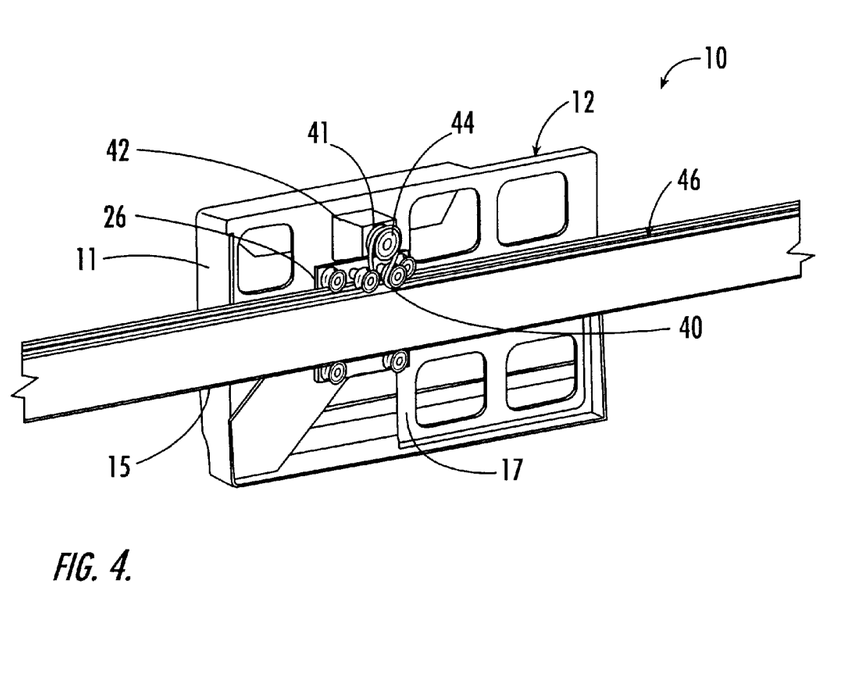
FIG. 4 is a rear perspective view of a display assembly and a rail according to one embodiment of the present invention.

FIGS. 3 and 4 show front and rear perspective views, respectively, of portions of the VAA system according to one embodiment of the present invention. In particular, the VAA system 10 includes a monitor assembly 12 that is free to move along a conveyor, such as an elongated rail 15. The monitor assembly 12 includes a flat screen monitor 11, such as a video monitor, and a carriage 26 that supports the monitor assembly 12 on the rail 15. In one embodiment, the monitor 11 is a 15-inch, digital flat screen video monitor with a screen resolution of about 1024 by 768. The resulting 0.0117" pixel spacing is the same in the X and Y axes, so that each pixel is in a fixed, closely-controlled location. The monitor 11 displays the assembly drawings in color using a video card set to 16-bit color or greater. The color display advantageously can be used to provide more detailed instructions or assembly warnings to the mechanic, as discussed below.

The monitor assembly 12 is preferably above and behind the workpiece so that the mechanic can constantly refer to the monitor 11 during assembly of the workpiece. More specifically, as the mechanic works along the workpiece, the mechanic can move the monitor assembly 12 along the rail 15. Advantageously, the computer automatically updates the drawing view shown on the monitor 11 to show the section of the workpiece directly in front of the monitor assembly 12 at a particular location. In one embodiment, a lever (not shown) is attached to the monitor assembly 12 and extends therefrom so that the mechanic can move the monitor assembly while having both hands full. In addition, a plurality of fastener bins (see FIG. 2) can be mounted to the monitor assembly 12 such that the bins move therewith, which provides the mechanic easy access to necessary parts.

Figure 5:
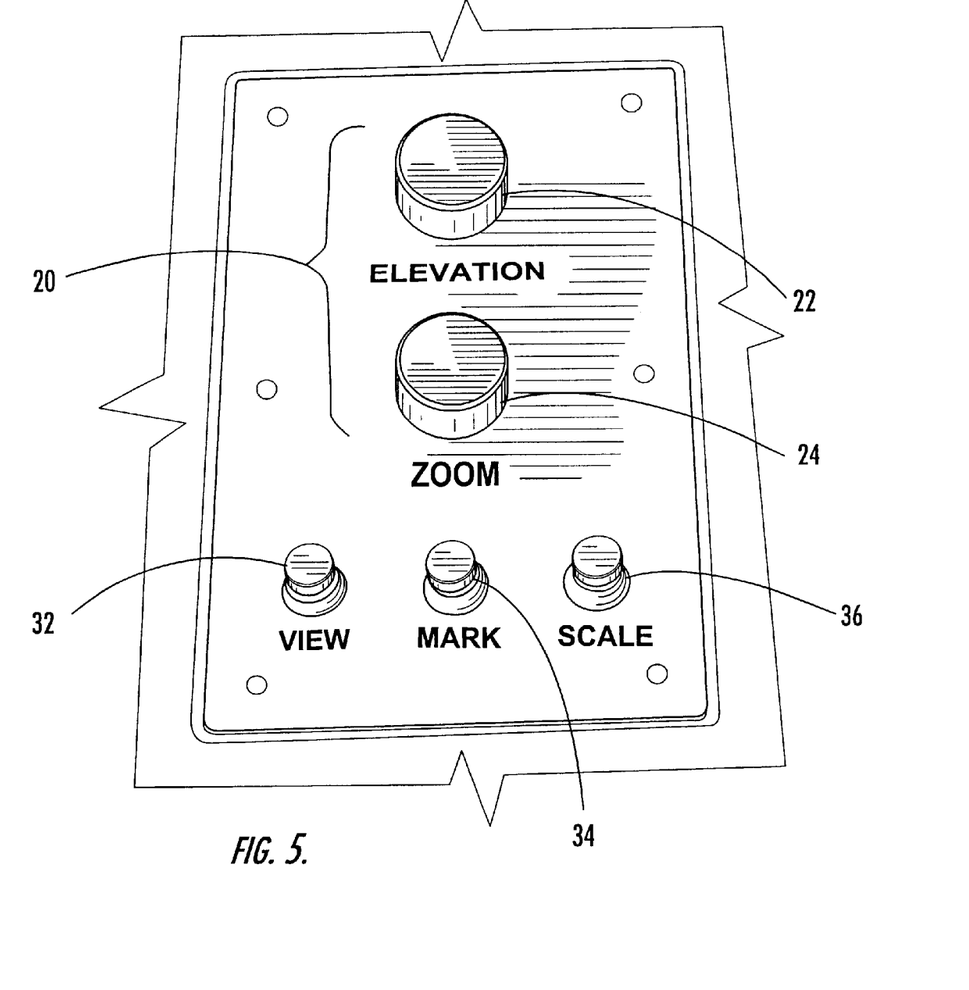
FIG. 5 is a greatly enlarged front perspective view of a plurality of hardware controls according to one embodiment of the present invention.

FIG. 5 shows a detailed view of a variety of hardware controls located on the front of the monitor assembly 12. Although comparable controls can be provided by means of an interactive display, including pull-down menus and the like, hardware controls will be described for purposes of example. In particular, FIG. 5 shows a pair of rotary knobs 20 for adjusting the vertical positioning or elevation 22 and the zoom level 24 of the view shown on the monitor 11. In one embodiment, the knobs 20 are single-turn 100K potentiometers, although other types of user feedback devices can also be used. Generally, once the mechanic sets the zoom level to a suitable level and centers the elevation view control, very little manual repositioning of the drawing is required thereafter. In addition, a lateral position control knob (not shown) can also be included for applications using a moving assembly line and a fixed monitor position, as discussed more fully below. In this manner, the mechanic can view recently-passed or upcoming areas of the assembly drawings for the workpiece.

The hardware controls of monitor assembly 12 also include at least one pushbutton 32 or multi-position switch that is used for selecting between drawing views. More specifically, the pushbutton 32 toggles the drawing view between two views, such as the front and top drawing views. The pushbutton could also be made to toggle between more than two views. This feature is useful during assembly of the workpiece in that warnings or other features that are attached to or associated with one drawing view will alert the mechanic to look at the second view to resolve ambiguous information from the current view. For example, all detail parts on a workpiece, such as an aircraft floorbeam, can be color-coded as blue, except for detail parts that have identical positions on both the front and back of the workpiece or are otherwise obscured in the front view of the assembly drawing. Advantageously, these locations are color-coded as red. A red color-coded portion of a particular view can be made to signify a potential hazard or other warning that can be further explained by the mechanic toggling to another view. Color-coding can be used for other parts and locations as well, such as color-coding bonding details as green or color-coding a particular fastener as orange. Accordingly, color-coding increases the efficiency of the workpiece assembly and provides the mechanic with more detailed instructions. Color-coding can also be used in an assembly line configuration, as discussed more fully below.

Alternatively, a selector switch can be used, particularly when more than two views are needed. In one embodiment, the selector switch also includes a switch or encoder integrated with a feature that can rotate the workpiece along its longitudinal axis. Thus, as the workpiece is rotated by the mechanic during assembly, the drawing is automatically switched between the front, back, top, and bottom views accordingly.

In one embodiment, the monitor assembly 12 of the VAA system also includes a marking or tracking button 34 for enabling accurate length measurement of drawing features or spacing between features selected by the mechanic. More specifically, an initial push of the tracking button 34 causes a crosshair to appear on the screen display of the monitor 11. The mechanic than locates the first point of the measurement under the crosshair by positioning the monitor assembly and adjusting the elevation and zoom positions using the knobs 20 or a mouse 13 (see FIG. 3). When the desired point is centered under the crosshair, the tracking button 34 is pushed again. The position is noted by the computer and stored in the RAM of the computer. The crosshair also changes color signifying that the computer is ready for the second point selection. The monitor assembly 12 is then moved to a new point along the workpiece and the tracking button 34 pushed for a third time, which stores the location of the new point in the computer memory. The distance between the two points, including the X and Y components of each, is displayed on the monitor 11. In one embodiment, the VAA system 10 has the ability to measure distances between features to within 0.005". The monitor assembly 12 also includes a scale override pushbutton 36 for returning the view to full-scale from a zoomed scale determined by rotating the zoom knob 24.

As mentioned above, the monitor assembly 12 also includes a trackball or mouse 13 that can be used to zoom in on particular areas of the given drawing and to manipulate the view displayed in the monitor 11. In particular, depressing the left mouse button will start one corner of a "rubber band" box. Moving the mouse with the left button depressed will draw a controllable box around the selected portion of the drawing. When the mouse button is released, the section of the drawing within the box is zoomed to fill the screen. In one embodiment, the screen can be returned to another view, including the original view, by moving the hardware controls as discussed above. The mouse 13 can also be used for positioning "mark-ups" on the assembly drawing and to interact with the computer operating system, as discussed more fully below.

It is also possible to incorporate voice commands in the VAA system 10 to one embodiment of the present invention. For example, VAA functions such as drawing number selection, zoom level, and cursor positioning for markup placement and distance measurement can be performed via voice command. Supporting documents can also be displayed via voice command, and voice commands could be stored as documenting comments in markup files and the like. In order to support voice commands, the VAA system 10 would also include a microphone and an associated speech recognition unit, typically comprised by the computing device.

FIG. 4 shows a rear view of the VAA system 10 according to one embodiment of the present invention. As shown in FIG. 4, the VAA system 10 includes a position-sensing device or feedback system 40 mounted to a frame 17 for determining the position of the monitor assembly 12 in relation to the workpiece. More specifically, the position feedback system 40 includes an encoder 42 having an output shaft 41 and a timing belt pulley 44 mounted thereto. In addition, a continuous loop timing belt 46 extends along the rail and threadably engages the carriage 26 and the timing belt pulley 44. In one embodiment, the monitor assembly 12 and the workpiece can be initially referenced to each other or to a common point. For example, the workpiece initially can be placed in a particular position relative to the rail 15, or the mechanic may provide a reference position indication, such as by depressing a particular key or pushbutton, once the monitor assembly 12 is aligned with a predetermined feature, such as one end, of the workpiece. Thus, as the monitor assembly 12 is moved back and forth along the rail, the timing belt 46 engages the carriage 26 and timing belt pulley 44 so that the output shaft 41 of the encoder 42 is rotated. The rotational position of the encoder 42 is continually monitored by the computer, which in combination with the encoder determines the location of the monitor assembly 12 in relation to the workpiece and displays the corresponding assembly drawing on the monitor 11 for a particular location. As the monitor assembly 12 is moved along the rail 15, such as by means of a mechanic sliding the monitor assembly along the rail, the encoder 42 determines the position of the monitor assembly relative to the workpiece, and the computer updates the portion of the assembly drawing being displayed by the monitor 11 to correspond with the current position of the monitor assembly 12. Alternatively, the encoder 42 can be substituted for a laser range finder, linear transducer, cable encoder, or other device capable of determining the position of the monitor assembly 12 along the rail 15. A rear view of the monitor 11 can also be seen through the frame 17.

In addition to the embodiment presented above, wherein the VAA system 10 can be moved along a fixed workpiece, an alternative embodiment of the VAA system 10 comprises a fixed or movable monitor assembly 12 for use in conjunction with a moving assembly line. In this embodiment, the computer and position feedback components described above are used as described above to collect and process information to determine the relative position of the monitor assembly 12 and the workpiece. The computer then continuously updates or refreshes the assembly drawing, such as at a rate of 10 times per second, to keep the assembly drawing correctly positioned in relation to the moving workpiece. In addition color-coding can be used in an assembly line for distributing workload between various mechanic workstations. For example, a first workstation can be designated to install all green color-coded parts, a second station designated to install all blue color-coded parts, and so on. Redistribution of workload between workstations can be changed by modifying the color codes of details on the assembly drawing.

Yet another embodiment of the VAA system 10 of the present invention comprises a video projector to project the assembly drawing directly onto the workpiece. According to this embodiment, the workpiece can be mounted to a rotator (not shown), which allows the mechanic to rotate the part about its longitudinal axis. A sensor (not shown) relays the workpiece's position to the computer, which calculates the corresponding drawing assembly position and automatically projects the assembly drawing views on the workpiece. Advantageously, the VAA system 10 according to this embodiment of the present invention can be adjustably positioned close to the workpiece, which reduces the need for accurate projection. Thus, the monitor assembly 12 can be moved directly above an area of interest on the workpiece, which reduces image distortion without added optical devices or software correction required by conventional systems. If the video projector is used to project assembly drawings onto the outside or inside surfaces of a large cylindrical object, such as a rocket booster casing or fuel tank, an encoder can be used to update the drawing view projection as the workpiece is rotated. In this manner, the position of the monitor assembly relative to the workpiece is measured the same in both the X and Y axes. Alternatively, a rail extending in the vertical or Y axis could be used to permit vertical movement of the projector so that projections can be made onto very wide workpieces.

Additional controls can be found in a plurality of drop-down menus that can be displayed on the monitor 11. These menus include drawing selections, additional zoom controls, print commands and drawing mark-up commands. The menus can be accessed by the mouse 13 or a keyboard (not shown). For example, the mouse 13 can be used to select a desired drawing from a standard Windows-based file dialog box from a drop-down menu. Under normal operating conditions, the mouse 13 and/or keyboard are not otherwise needed to operate the VAA system 10; however, they do provide user-friendly controls for performing various tasks, such as selecting a drawing to load by selecting a part number from a drop-down menu. Other methods of selecting a drawing can also be used, such as by scanning a bar code.

Advantageously, the VAA system 10 also includes mark-up tools for providing additional instructions, warnings, and corrections for drawing errors, such as an incorrect fastener grip length or incorrect hole sizing. Generally, mark-ups are drawing overlays that are stored in a separate file from the actual assembly drawing. Mark-up files are preferably text-based files comprising the mark-up type (e.g., text or arrow), X and Y starting points, and mark-up text strings. By default, all mark-ups are preferably shown in red. In one embodiment, text mark-ups are created in a multi-line text box, then electronically "pasted" to the particular assembly drawing. As long as the left button of the mouse 13 is held down, the mark-up can be positioned anywhere on the display screen of the monitor 11. When the mouse button is released, the mark-up text is pasted to the screen and added to a mark-up file for that particular assembly drawing. Keyboard editing shortcuts for cut, copy, and paste are also supported in the mark-up editing box. Once a mark-up is created and positioned, it cannot be edited or moved. Preferably, the mark-up must first be deleted and a revised mark-up pasted in its place. To delete a mark-up, a "delete mark-up" menu command must be selected and a rubber-band box be drawn around the mark-up to be deleted. After a confirmation, all mark-ups within the box can then be deleted. For safety reasons, the VAA system software preferably does not include the ability to alter the original assembly drawing. Accordingly, by using a software command to hide all mark-ups, the screen will display the original assembly drawing, suitable for use as an inspection document.

In addition, a special mark-up command is used to create fastener callouts. In particular, a dialog box with four blank fields for entering fastener parameters is used to create a fastener callout. As with the text mark-up described above, the fastener callout is represented with a rubber-band box until the mouse button is released. Thus, the fastener callouts provide the mechanic with extra information in order to increase efficiency and reduce error.

The VAA system software also can be incorporated into a network. In particular, drawings and markups can be located in a public folder with limited access rights. In addition, a copy of the drawings and related files can be kept on local machines; however, the VAA system 10 refers to the public folders for drawings by default. In order to verify the most recent drawings, the VAA system software compares the date stamp on the particular drawing and mark-ups in the public folder to the versions located on the local hard drive. Updated files will be copied to the local drive. If there is a network failure, the VAA system uses the files on the local hard drive.

As described above, assembly drawings are displayed on the monitor 11 corresponding to the location of the monitor assembly 12 along the workpiece. In a presently preferred embodiment, the drawing files are color HPGL plot files. Advantageously, HPGL is a universal file format, and almost all Computer-Aided-Design (CAD) programs have the ability to create HPGL files. In addition, HPGL files contain size and placement definitions of lines and other drawing entities. Therefore, if a particular assembly drawing file is created as a full-scale plot file, the drawing includes accurate feature size information, which gives the VAA system 10 of the present invention the ability to display the drawing to the same accuracy as the data set of the original assembly drawing. In addition, an HPGL file has virtually unlimited resolution. Therefore, the smallest feature or type can be zoomed in to fill the screen without graininess or loss of detail.

The VAA system also includes a software feature in conjunction with the computer for providing improved graphics to the monitor 11. As mentioned above, many elongated workpieces are so long that multiple sheets are required for assembly drawings. Advantageously, the program of the VAA system 10 detects the end of one drawing sheet loaded into the computer and automatically loads or "jumps" to the beginning of the next drawing sheet. As the monitor assembly 12 is moved relative to the workpiece, the jump gives the illusion that the multiple drawings sheets are a continuous assembly drawing. In order to determine the location of the multiple drawing sheets for a particular workpiece, a utility gathers information about the particular drawing file. More specifically, the first time a previously unused assembly drawing is loaded into the computer of the VAA system 10, the utility automatically prompts the mechanic for the number of drawing sheets. The mouse 13 and/or other hardware controls are used to indicate one side of the workpiece and the drawing sheet overlap locations. In addition, the mechanic indicates the drawing elevations where the front, top, and other drawing views can be found. This information, which typically takes less than one minute to collect, is then written to a separate file that is loaded into the computer of the VAA system when the particular assembly drawing file is loaded into the computer.

Many modifications and other embodiments of the invention will come to mind to one skilled in the art to which this invention pertains having the benefit of the teachings presented in the foregoing descriptions and the associated drawings. For example, while it has been described that virtual reality systems are not advantageous because they may disorient the user, it is still possible to incorporate the teachings of the present invention in a heads-up-display (HUD) eyepiece. More specifically, the part of the assembly shown on the VAA screen or the HUD eyepiece display is determined by where the user is standing relative to the part, including the user's head angle. The user's position relative to the assembly can be determined by either sensors on the user that measure the distance to a fixed reference or by an external sensor that monitors the user and broadcasts the user's position to the HUD via a wireless link. The head angle can be determined by a tilt sensor on the HUD. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A visual aid apparatus for providing assembly instructions of a workpiece, comprising:
    a computer having a memory device;
    a monitor operatively connected to the computer wherein at least one of said monitor and the workpiece are movable relative to the other; and
    a position-sensing device operatively connected to the monitor, wherein the position-sensing device is capable of determining the position of the monitor relative to the workpiece and sending the relative position to the computer, the computer being capable of determining assembly instructions according to the relative position and providing the assembly instructions for display on the monitor.

2. A visual aid apparatus according to claim 1, wherein the assembly instructions include a plurality of colors assigned to various components of the workpiece to assist an operator in assembly thereof.

3. A visual aid apparatus according to claim 2, wherein similar components of the workpiece are assigned a similar color.

4. A visual aid apparatus according to claim 1, further comprising an elongated rail extending lengthwise proximate the workpiece.

5. A visual aid apparatus according to claim 4, wherein the monitor is movable along the rail by an operator.

6. A visual aid apparatus according to claim 1, further comprising bins capable of storing at least fasteners for the workpiece.

7. A visual aid apparatus according to claim 1, further comprising hardware controls operable to control the monitor display.

8. A visual aid apparatus according to claim 1, wherein the position-sensing device includes a timing belt and a timing belt pulley that move relative to the monitor such that the position of the monitor can be determined by a corresponding rotational position of the timing belt pulley.

9. A visual aid apparatus according to claim 1, wherein the position-sensing device includes a position sensor selected from the group consisting of a laser range finder, linear transducer, and cable encoder, the position sensor capable of measuring the position of the monitor relative to the workpiece.

10. A visual aid apparatus according to claim 1, wherein the assembly instructions include an original assembly drawing and at least one mark-up instruction that provides at least one revision to the original assembly drawing.

11. A visual aid apparatus according to claim 1, wherein the position-sensing device includes a feedback axis with vertical relative repositioning of the workpiece relative to the monitor.

12. A visual aid apparatus according to claim 1, wherein the position-sensing device includes a feedback axis with rotational relative repositioning of the workpiece relative to the monitor.

13. A visual aid apparatus according to claim 1, further comprising hardware controls that enable an operator to measure distances between features of the workpiece.

14. A visual aid apparatus according to claim 1, wherein the computer is able to detect an end of a first sheet of assembly drawings and automatically displaying a second sheet of assembly drawings such that the first and second sheets of assembly drawings are a single sheet of assembly drawings.

15. A visual aid apparatus according to claim 1, wherein the computer is capable of including other information with the assembly instructions displayed on the monitor, the other information selected from at least one of the group consisting of additional instructions, warnings, and corrections to the assembly instructions.

16. A visual aid apparatus for providing assembly instructions of a workpiece, comprising:
    a computer having a memory device;

a video projector operatively connected to the computer wherein at least one of the video projector and the workpiece are movable relative to the other; and a position-sensing device operatively connected to the monitor, wherein the position-sensing device is capable of determining the positioning of the video projector relative to the workpiece and sending the relative position to the computer, the computer being capable of determining assembly instructions according to the relative position and providing the assembly instructions for projection toward the workpiece by the video projector.

17. A visual aid apparatus according to claim 16, wherein the video projector projects the assembly drawings directly onto the workpiece.

18. A visual aid apparatus according to claim 16, wherein the assembly instructions include a plurality of colors assigned to various components of the workpiece to assist an operator in assembly thereof.

19. A visual aid apparatus according to claim 16, wherein the video projector is movable relative to the workpiece by an operator.

20. A method of providing a visual aid for assembling workpieces, comprising:

determining a position of a monitor positioned relative to a workpiece;

determining a corresponding position of an assembly drawing for the workpiece; and displaying the corresponding position of the assembly drawing.

21. A method according to claim 20, wherein the monitor position determining step includes determining a rotational position of a timing belt pulley that is operably connected to the monitor.

22. A method according to claim 20, wherein the assembly drawing determining step includes sending the position of the monitor from a position-sensing device to a computer, the computer being capable of selecting corresponding assembly instructions according to the relative position and providing the assembly instructions for display on the monitor.

23. A method according to claim 20, further comprising alerting an operator to resolve ambiguous information present in the assembly drawing when assembling the workpiece.

24. A method according to claim 20, further comprising moving the monitor relative to the workpiece such that the corresponding position of the assembly drawing is displayed while the monitor is moving.

25. A method according to claim 20, further comprising revising the assembly drawing and storing the revisions.

26. A method according to claim 20, wherein the assembly drawing displaying step includes displaying warnings to an operator such that the operator is alerted to ambiguous or important information in the drawings.

27. A method according to claim 20, wherein the displaying step includes displaying the assembly drawing in a plurality of colors.

28. A method according to claim 20, further comprising positioning the workpiece on a conveyor and determining the position of the workpiece relative to the monitor.

* * * * *